United States Patent
Hodebourg et al.

(10) Patent No.: US 9,534,698 B2
(45) Date of Patent: Jan. 3, 2017

(54) THREE-WAY VALVE WITH TOP END-STOP ON THE AIR PATHWAY

(75) Inventors: Grégory Hodebourg, Sartrouville (FR); Sébastien Adenot, Pontoise (FR)

(73) Assignee: Valeo Systemes de Controle Moteur, Cergy Pontoise (FR)

( * ) Notice: Subject to any disclaimer, the term of this patent is extended or adjusted under 35 U.S.C. 154(b) by 1087 days.

(21) Appl. No.: 13/591,554

(22) Filed: Aug. 22, 2012

(65) Prior Publication Data

US 2013/0047967 A1 Feb. 28, 2013

(30) Foreign Application Priority Data

Aug. 23, 2011 (FR) ...................................... 11 57463

(51) Int. Cl.
*E03B 1/00* (2006.01)
*F16K 11/16* (2006.01)
(Continued)

(52) U.S. Cl.
CPC ................ *F16K 11/22* (2013.01); *F02M 26/54* (2016.02); *F02M 26/69* (2016.02); *F02M 26/71* (2016.02);
(Continued)

(58) Field of Classification Search
CPC ................ Y10T 137/87113; Y10T 137/87016; F02M 25/07407; F02M 25/0709; F02M 25/071; F02M 25/0718; F02M 25/0719; F02M 25/0724; F02M 26/06; F02M 26/52; F02M 26/54; F02M 26/64; F02M 26/71; F02M 26/51; F02M 26/53; F16K 11/166; F16K 11/163; F16K 11/165; F16K 31/041; F16K 31/535; F16K 31/53; G05D 7/0652; G05D 7/0664; G05D 11/003; G05D 11/135–11/1293
(Continued)

(56) References Cited

U.S. PATENT DOCUMENTS 4,501,295 A 2/1985 Williams et al.
5,704,398 A 1/1998 Baker
(Continued)

FOREIGN PATENT DOCUMENTS

GB 2280243 A 1/1995
WO 2009/106727 A1 9/2009
WO WO 2011024211 A1 * 3/2011 ......... F02M 25/0729

OTHER PUBLICATIONS

French Search Report issued in FR 1157463, mailing date Mar. 20, 2012 (2 pages).

*Primary Examiner* — Mary McManmon
*Assistant Examiner* — Hailey K Do
(74) *Attorney, Agent, or Firm* — Osha Liang LLP

(57) ABSTRACT

Three-way valve with two flaps comprising single control means (9) for the two flaps and actuation means (12, 13, 50) arranged each to drive, pivotwise, one of the two flaps, from one to the other of its open and closed position of one of the pathways, with a temporal phase-shift, characterized in that it comprises maximum displacement end-stops for each of said actuation means, the end-stop (31) of the second actuation means (12, 50) corresponding to a fully closed position of its flap and the end-stop of the first actuation means (13) being positioned beyond the position of said first actuation means when the second actuation means (12, 50) is on its end-stop (31), the kinematic chains linking the first and second actuation means to the single control means operating nominally.

13 Claims, 6 Drawing Sheets

(51) Int. Cl.
  *F02B 47/08*    (2006.01)
  *F02M 25/07*    (2006.01)
  *F16K 11/22*    (2006.01)

(52) U.S. Cl.
  CPC ..... *Y10T 137/0329* (2015.04); *Y10T 137/8225* (2015.04); *Y10T 137/87692* (2015.04)

(58) Field of Classification Search
  USPC ............... 60/278, 279, 605.2; 123/568.12; 137/553–556.6
  See application file for complete search history.

(56) References Cited

U.S. PATENT DOCUMENTS

| | | | | |
|---|---|---|---|---|
| 8,561,645 B2* | 10/2013 | Leroux | .............. | F02M 25/0709 123/568.24 |
| 8,789,560 B2* | 7/2014 | Holley | ................. | F16K 11/165 137/597 |
| 2009/0050830 A1* | 2/2009 | Albert | ................. | F02B 29/0418 251/129.11 |
| 2012/0056118 A1* | 3/2012 | Yokoyama | ......... | F02M 25/0729 251/248 |

\* cited by examiner

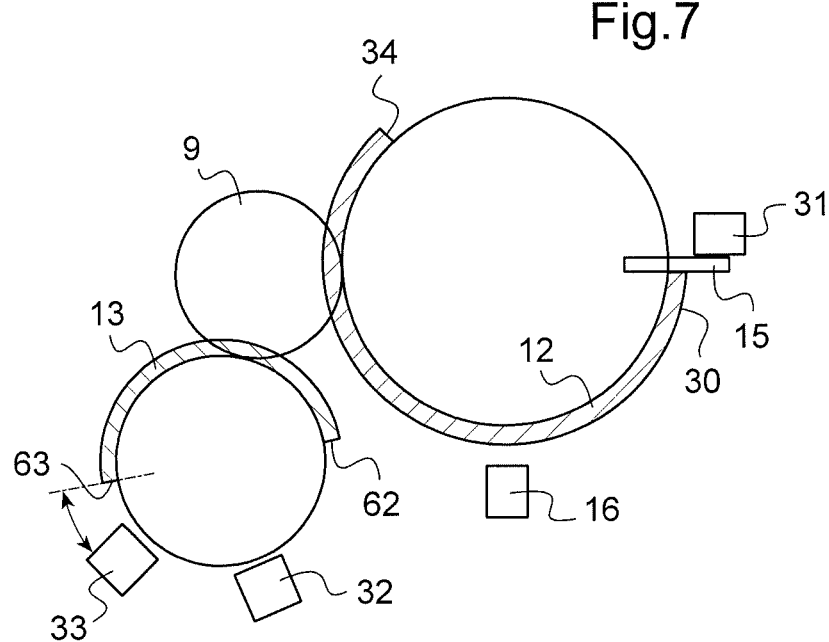
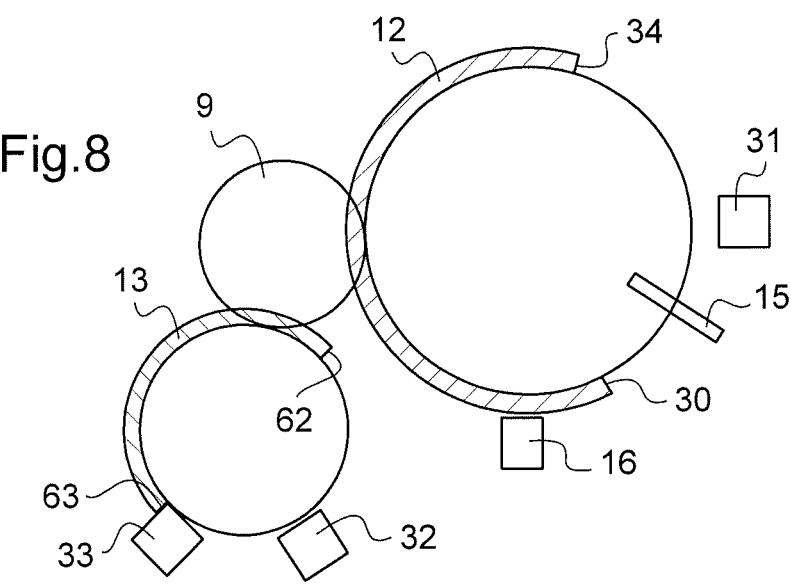

THREE-WAY VALVE WITH TOP END-STOP ON THE AIR PATHWAY

The field of the present invention is that of motor vehicles and, more particularly, that of the equipment for powering the engine.

A motor vehicle heat engine comprises a combustion chamber, generally formed by a plurality of cylinders, in which a mixture of fuel and air is burned to generate the work of the engine. The air may be compressed or not, depending on whether the engine does or does not include a turbocharger. In the case of an engine with turbocharger, the air, compressed by the compressor, is taken into the engine where it is burned with the fuel then evacuated via the exhaust ducts. The exhaust gases drive a turbine, attached to the compressor and forming with it the turbocharger.

The intake air may also be mixed with exhaust gases; this introduces the concept of recirculated exhaust gases and of circulation of the gases along a so-called EGR (exhaust gas recirculation) loop. The gases taken into the combustion chamber are then called intake gases. A reduction of the polluting emissions, in particular of the nitrogen oxide emissions, is thus obtained.

The recirculation of the exhaust gases can be called "low pressure" when it is applied to the exhaust gases tapped after the turbine and reintroduced before the compressor, or "high pressure" when it is applied with the gases tapped before the turbine and reintroduced after the compressor. As an example, the low-pressure recirculation is mainly used, on a petrol engine, to reduce the fuel consumption and obtain a better engine efficiency.

The gases are therefore conveyed by various ducts and their circulation is controlled using valves, which allow, inhibit or regulate their movements in these ducts. In the case of an EGR loop, so-called "three-way" valves have already been proposed. Such a valve can be arranged upstream of the compressor of the turbocharger, that is to say on the mixture intake duct, where it regulates the quantity of air circulating in said duct and the quantity of exhaust gas taken into the latter. The valve is then said to be arranged on the cold side of the engine because it is placed on the intake line rather than on the exhaust line.

For a three-way valve arranged on the cold side, a number of operating modes of the valve, and therefore of the engine, can be envisaged. The engine may receive only fresh air, with no recirculated exhaust gases. The engine may also receive fresh air mixed with a portion of the exhaust gases, the pressure difference between the exhaust and the intake of the engine then being sufficient to ensure the recirculation of the exhaust gases. When the pressure difference is not sufficient for the recirculation of the exhaust gases and to ensure the correct EGR rate, a back-pressure can be created by throttling the exhaust pathway downstream of the EGR loop, in order to thus force a portion of the exhaust gases towards the intake pathway of the engine. This solution, by its complexity, is not, however, very satisfactory, and it is preferable to use the EGR loop as follows.

With the flow rate of fresh air in the air inlet pathway of the EGR valve at maximum, the pathway for the EGR gases is progressively opened in the valve and, before the flow rate of the EGR gases in the valve stops increasing, the fresh air inlet pathway is progressively closed to continue to cause the flow rate of the EGR gases to increase, following an increasing monotonic curve.

A patent application has been filed by the applicant, under the number WO 2009/106727, which describes a three-way valve with two flaps in which the two flaps are arranged in the two inlet pathways of the valve and are actuated with a temporal offset by one and the same actuation means.

This configuration provides only a single sensor to know the position of the flaps, which is placed on the control of the flap for the recirculated gases (pathway for the gases or EGR pathway). It follows that a failure on the control pathway of the air intake flap (air pathway) is not detected.

A first solution to resolve this problem would be to place a second sensor on the air pathway. This solution is not, however, satisfactory because of the cost and bulk of the additional components that it involves.

The aim of the present invention is to remedy these drawbacks by proposing a three-way valve designed so that a defect on one of the pathways, air or EGR, can be detected using a single sensor.

To this end, the subject of the invention is a three-way valve with two gates respectively arranged in two of the three pathways of the valve, said valve comprising single control means for the two gates and first and second actuation means arranged to be controlled by the single control means and to each drive one of the two gates from one to the other of a first and a second position, said control and actuation means being configured to enable the two gates, in a nominal operating mode, to simultaneously reach their respective second positions.

According to the invention, said valve includes a maximum displacement end-stop for at least one of said actuation means, said end-stop being configured to block said actuation means when the corresponding gate is in its second position, said valve also comprising means for detecting a travel of said other gate beyond its second position.

Thus, according to the invention, the integrity of the kinematic chains is checked on all the pathways, and this is done using detection means provided on only one of them. The detection means make it possible to diagnose not only a defect on the equipped pathway but also on the other pathway. This is because, if the gate fitted on the pathway equipped with the detection means exceeds the prescribed position, this means that the actuation means of the gate fitted on the other pathway has not reached its end-stop position and that there is a defect in the corresponding kinematic chain.

In the exemplary application described above, the detection means thus make it possible to identify an overshoot of the fully open position by the flap for the gases and therefore a failure in the kinematic chains of the air chain, with no additional sensor.

According to different embodiments which can be taken together or separately:
  said means for detecting a travel of the other gate beyond its nominal travel comprise a means for measuring the position of said other gate,
  said maximum displacement end-stop is designed to block said second actuation means and said means for detecting a travel of the other gate beyond its nominal travel comprise an end-stop for the first actuation means, configured to be positioned beyond the position of said first actuation means when the second actuation means is on its end-stop in nominal operating mode,
  said means for detecting a travel of the other gate beyond its nominal travel also comprise an end-of-travel end-stop, provided on said first actuation means and a detector of contact between said end-of-travel end-stop and the end-stop of said first actuation means, said gates are flaps, said control and actuation means are configured to drive said flaps pivot-wise and the first and second actuation means include toothed crown ring segments, said end-stop of the first actuation means is arranged facing one of the faces forming the end of the corresponding toothed crown ring segment.

According to an exemplary implementation, the second actuation means also comprises a pawl circulating in a scallop formed in the toothed crown ring segment of the second actuation means, the end-stop associated with said second actuation means being attached to the body of the valve and positioned facing said pawl.

According to a variant, the second actuation means also includes a control wheel, linked in rotation to the first flap and free in rotation relative to said toothed crown ring segment, said control wheel being able to be driven by said toothed crown ring segment when said first flap switches from its first position to its second position. Said control wheel includes, for example, a diagnostic end-stop configured to abut against the maximum displacement end-stop when the second gate is in its second position.

According to one aspect of the invention, said first and second positions are open and closed positions of one of the pathways.

According to another aspect of the invention, said control and actuation means are configured to drive said gates with a temporal phase-shift so that, while continuing to displace the first gate from its first position to its second position via the first actuation means to open, respectively close, the corresponding pathway, the second gate is made to begin to displace from its first position to its second position via the second actuation means, to close, respectively open, the corresponding pathway.

According to another aspect of the invention, said second actuation means is returned by a return spring from its second position to its first position.

According to another aspect of the invention, the gates are arranged in its two inlet pathways, the valve then being an EGR loop valve for the cold side, linked to the intake manifold of an internal combustion engine of a motor vehicle.

The invention also relates to a method for testing the integrity of the kinematic chain of a three-way valve as described above, said method comprising a step for setting said first actuation means in motion via said single control means, from the first position of the associated gate towards the second position of said gate, followed by a step for measuring the extreme position reached by said flap.

The invention will be better understood, and other aims, details, features and advantages thereof will become more clearly apparent from the following detailed explanatory description, of an embodiment of the invention given as a purely illustrative and nonlimiting example, with reference to the appended schematic drawings.

In these drawings:

FIG. 6 is a schematic diagram showing the three-way valve of FIGS. 3 to 5, in normal operation, in the position corresponding to FIG. 2a;

Figure 2A:
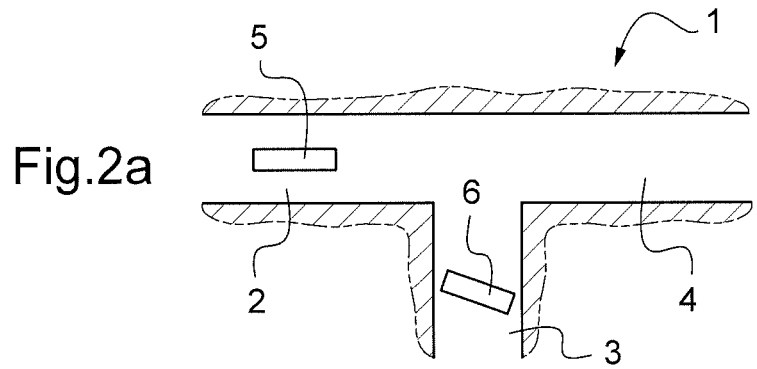
FIGS. 2a to 2d are schematic views showing, generically, the operation of the three-way valve of an EGR loop, with the different positions taken by its flaps.
Figure 2B:
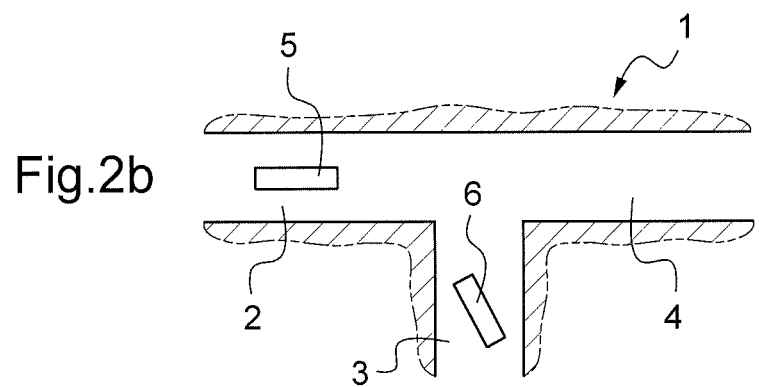
Figure 2C:
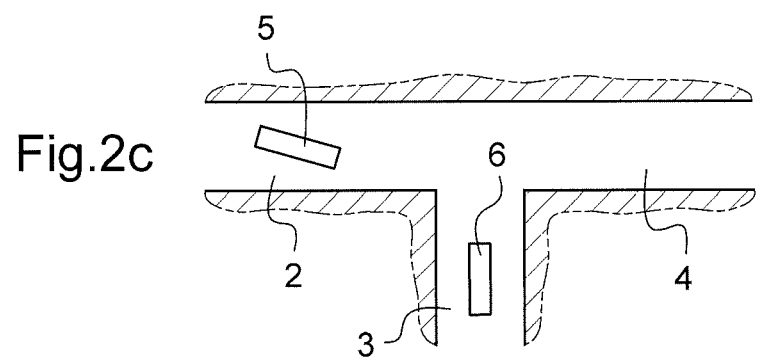
Figure 2D:
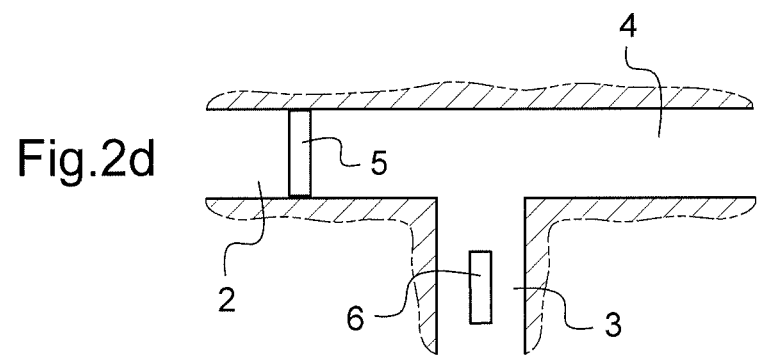
Figure 9:
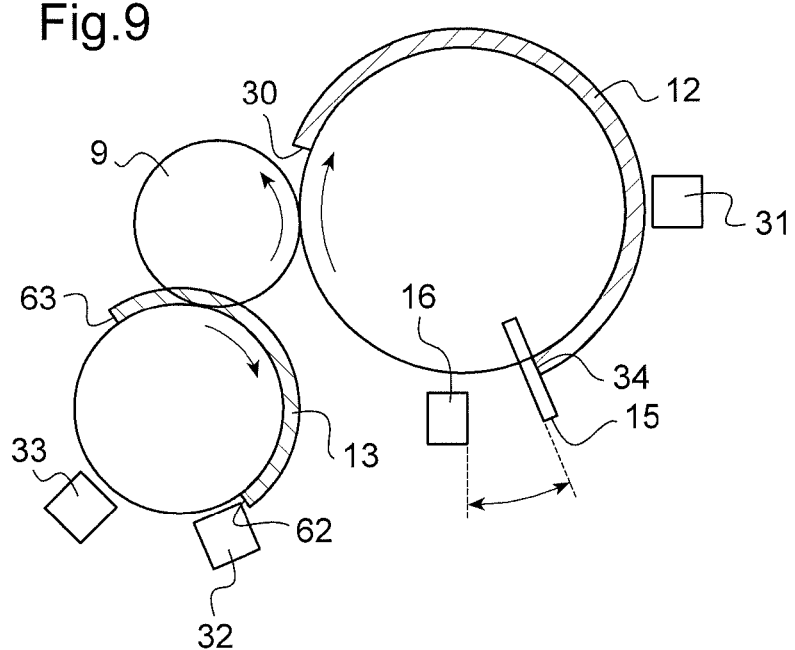
Figure 10:
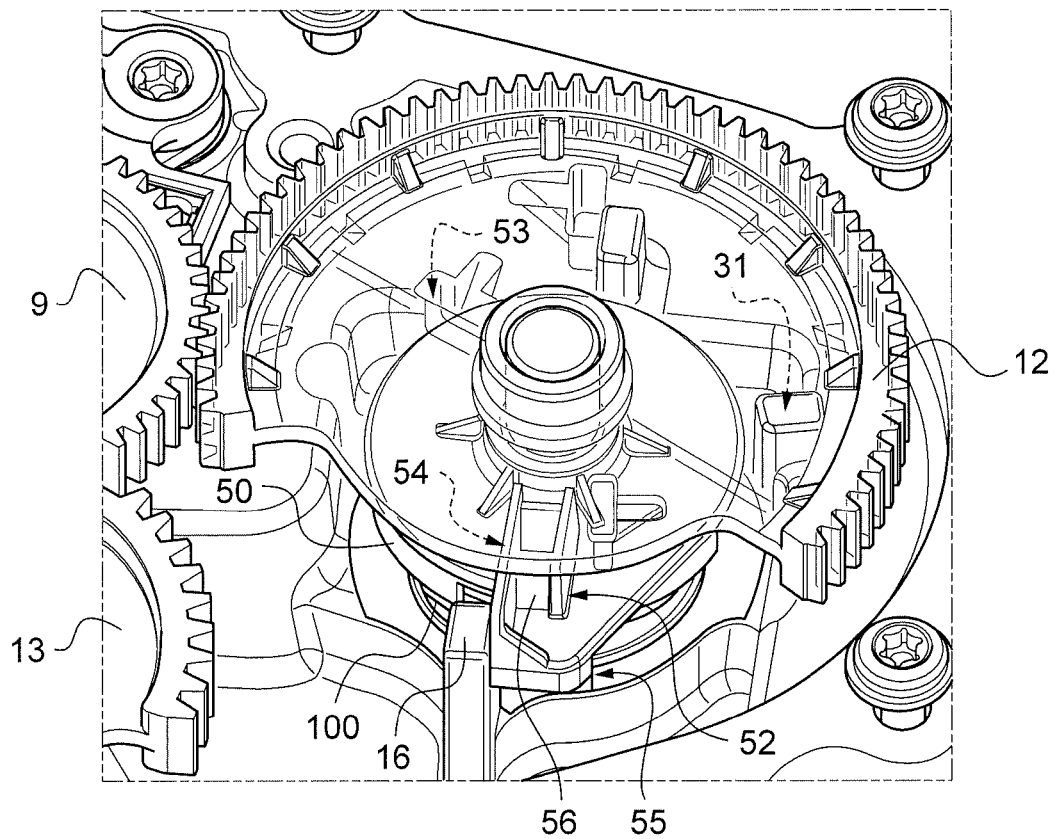

FIG. 7 is a schematic diagram showing the preceding three-way valve, in normal operation, in the position corresponding to FIG. 2d, FIG. 8 is a schematic diagram showing the preceding three-way valve, in the position corresponding to FIG. 2d, in the case of a break occurring in the driving of the air pathway, FIG. 9 is a schematic diagram showing the preceding three-way valve, in a filled position following a break of the return spring of the flap of the air pathway, and FIG. 10 is a partial perspective view of a second implementation of a three-way valve according to the invention.

Figure 1:
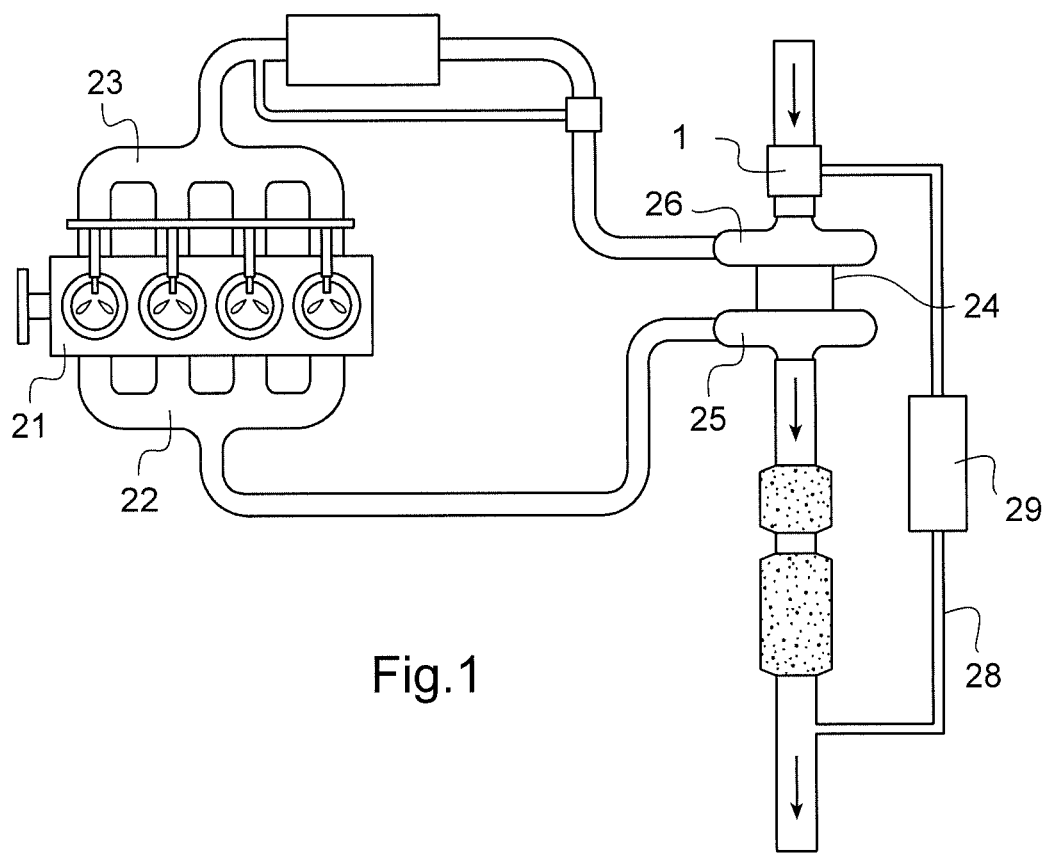
FIG. 1 is a schematic view of an EGR loop installed on a turbocharged engine, according to the prior art.

Referring to FIG. 1, this shows an internal combustion engine 21 of a motor vehicle, provided with an exhaust gas recirculation (EGR) loop, comprising an intake manifold 23 for the engine to receive air and exhaust gases from a compressor 26 of a turbocharger 24, an exhaust manifold 22 for the combustion gases, a turbocharger 24 turbine 25 and the EGR loop 28, with a cooler 29 and the low-pressure three-way valve 1 which is arranged upstream of the compressor 26 of the turbocharger 24. This three-way valve is linked to the compressor by its outlet and has two inlets for receiving fresh air (air pathway) and the cooled exhaust gases (EGR pathway or gas pathway), in a mixture whose pressure is increased by the compressor 26.

FIGS. 2a to 2d schematically represent the three-way valve 1, with its air inlet 2, its recirculated exhaust gas inlet 3 and an outlet for the air and gas mixture 4. The valve 1 is, here, a valve with two flaps, one flap 5 in the air inlet pathway 2 and one flap 6 in the gas inlet pathway 3. The operation of the valve, when it concerns enabling the EGR loop, is as follows: at the outset, the air flap 5 is in an angular position (0°) allowing for a maximum air flow rate in the pathway 2 and the gas inlet flap 6 is in an angular position (90°) blocking the pathway 3. This situation is the one in which the engine is running, for example, when stopped and idling.

The enabling of the loop is reflected in a start of pivoting of the gas inlet flap 6, without the air flap 5 pivoting, thus progressively opening the pathway 3 to the EGR exhaust gases (FIG. 2a). With the air flap 5 still remaining in the same maximum open position of the air inlet 2, the gas flap 6 continues to pivot to considerably open the gas pathway 3 (FIG. 2b). In a certain angular position of the gas flap 6, here 35°, that is to say, after a rotation of 55°, the flow rate of the EGR gases in the pathway 3 to all intents and purposes stops increasing and, while continuing to pivot the gas flap 6, the air flap 5 is then made to begin to pivot to close the air inlet pathway 2 and thus force the engine to suck in more EGR gas (FIG. 2c). This phase can continue to an extreme position in which the gas flap 6 reaches the maximum open angular position (0°) of the gas inlet pathway 3 and in which the air flap is in the angular position (90°) blocking the air inlet pathway 2 (FIG. 2d).

A kinematic chain allowing for the implementation of a three-way valve 1 according to the invention, operating according to the principle defined above, will now be described with reference to FIGS. 3 to 5.

The kinematic chain of the three-way valve 1 comprises a gear system extending, here, between a direct current motor 7 and two shafts 51, 61 driving, in rotation, respectively the air flap 5 and the gas flap 6. The two shafts 51, 61 extend parallel to one another. The shaft 14 of the electric motor 7 has a pinion 8 attached to it driving an intermediate toothed wheel 9 which has peripheral teeth 10 and central teeth 11. The peripheral teeth 10 of the intermediate wheel mesh with a toothed crown ring 12 driving the air flap 5 in rotation. The toothed crown ring 12 is free in rotation relative to the axis 51 of the flap 5. The driving of this flap 5 in rotation by the crown ring 12 is obtained via a drive pawl 15 which is rotationally attached to the axis 51 of the flap 5. This pawl 15 is arranged resting against an adjustable end-stop, or bottom air end-stop 16, which is attached to the body of the valve (not represented). The crown ring 12 includes an angular scallop 17 designed to allow the free rotation of the crown ring 12 over a defined angular segment, without driving the pawl 15, and therefore without driving the flap 5. It is when the crown ring 12 is driven in rotation beyond this angular segment, in one direction or in the other, that a first edge of the scallop 17, forming a driving end-stop 30, then drives the pawl 15. As will be explained in more detail later, the opposite edge of the scallop 17 of the crown ring 12 also forms an end-stop, called return end-stop 34.

The central teeth 11 of the intermediate wheel 9 mesh with a toothed crown ring 13 driving the gas flap 6 in rotation. The toothed crown ring 13 is attached in rotation to the axis 61 of the flap 6. It extends circularly only over an angular segment, the ends of which have radial faces suitable for cooperating with parts attached to the body of the valve, which form end-stops for the circular displacement of the toothed crown ring 13, as will be explained later.

In normal mode, under the action of the motor 7, the flap 6 is therefore driven in rotation directly by the rotation of the crown ring 13, while the flap 5 is driven in rotation only when the crown ring 12 is driving the pawl 15 in rotation.

In the example considered, the electric motor 7, via its pinion 8 when it is driven in rotation in the counter-clockwise direction, drives the intermediate wheel 9 in rotation in the clockwise direction. In its turn, the wheel 9, by its teeth 10, 11, drives, in the counter-clockwise direction, the two toothed crown rings 12, 13 which are therefore driven in rotation by the same intermediate wheel 9, but via two different sets of teeth 10, 11. As an example, the meshing ratio between the shaft 14 of the electric motor 7 and the gas flap 6 is here approximately 16, whereas the ratio between the shaft 14 and the air flap 5 when it is driven is approximately 7.

The mechanism for phase-shifting the closure of the air flap 5 will now be described, in relation to FIGS. 3, 4 and 5 which show the toothed crown rings and wheels at different steps in the rotation of the pinion 8.

Figure 3:
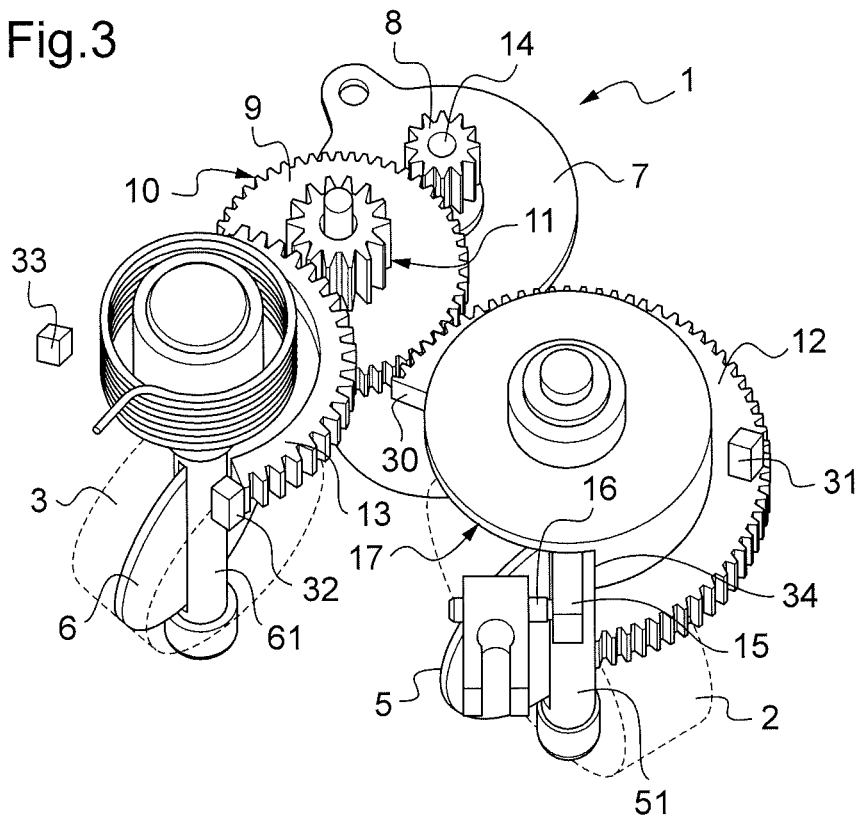
FIGS. 3 to 5 show the control devices for the two flaps of a first embodiment of a three-way valve according to the invention, in the positions corresponding to the cases represented respectively in FIGS. 2a, 2b and 2d.
Figure 4:
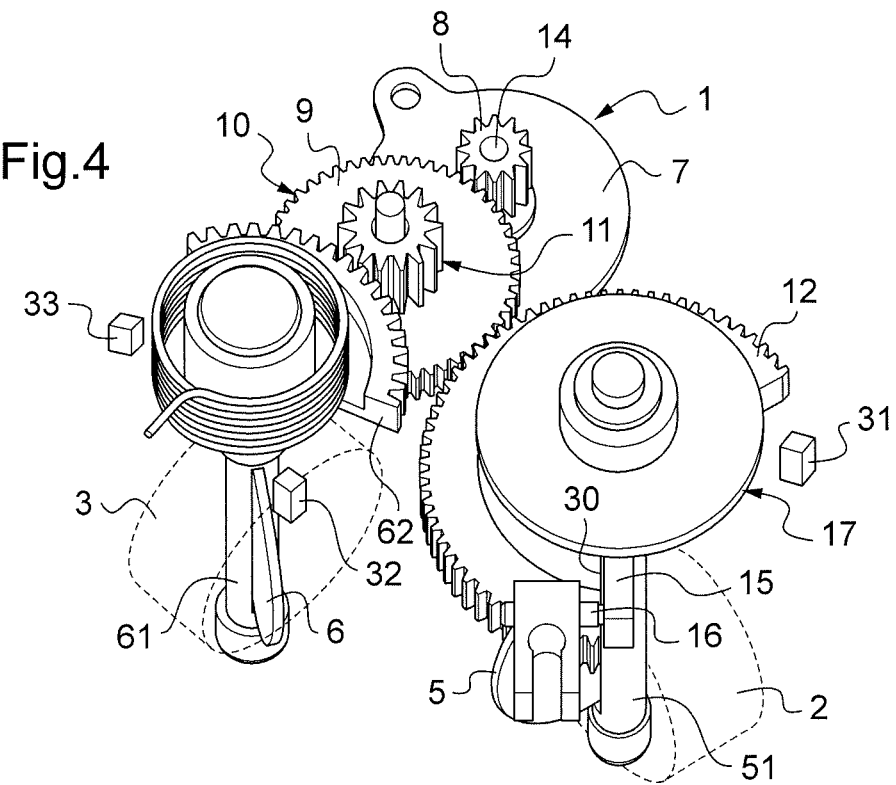

From FIG. 3 to FIG. 4, the crown rings 12 and 13 are driven in the counter-clockwise direction so as to cause the gas flap 6 to open, whereas the air flap 5 remains immobile, and does so by virtue of the angular scallop 17. In the position of FIG. 4, the edge of this scallop 17 which forms the driving end-stop 30, comes into contact with the pawl 15. The rotation of the crown ring 12 then continues toward the position represented in FIG. 5, the pawl 15 (and consequently the flap 5) then being driven in rotation by the driving end-stop 30. The air flap 5 therefore closes with a temporal phase-shift relative to the gas flap 6, by virtue of the presence of the scallop 17.

Figure 5:
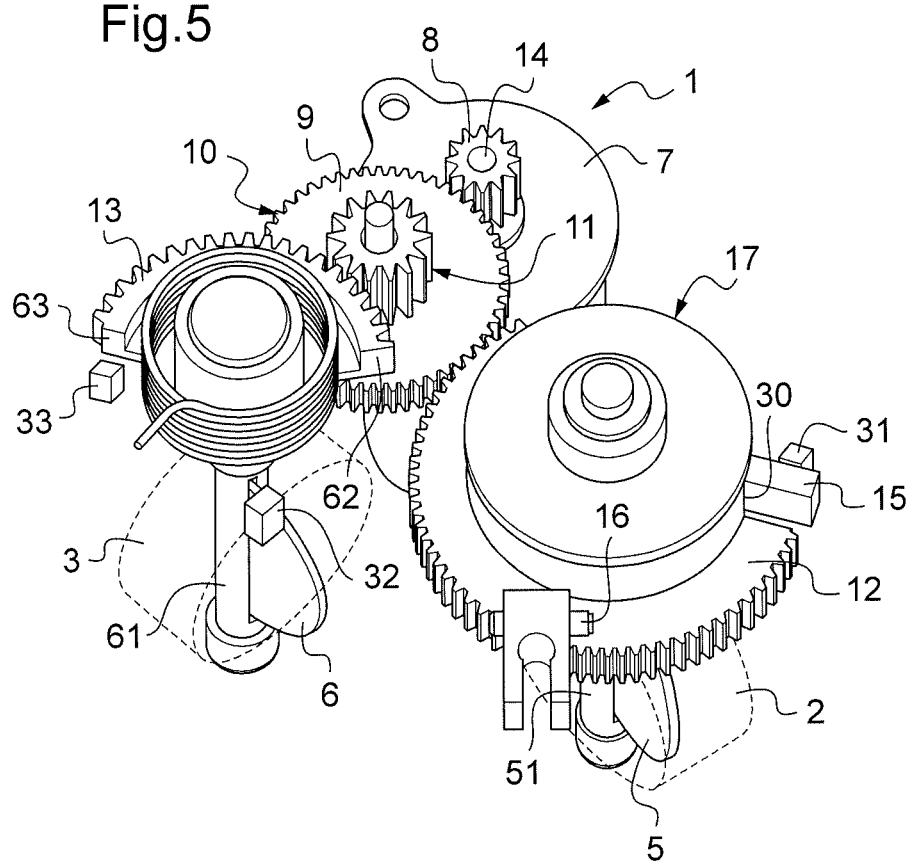

FIGS. 3 to 5 also represent a number of end-stops associated with the toothed crown rings 12 and 13. On the air pathway, there is a top air end-stop 31, attached to the body of the valve 1, which corresponds to the extreme position that the pawl 15 reaches when the air flap 5 is in the fully closed position. The pawl 15, in normal operation, is thus displaced, in one direction under the action of the driving end-stop 30 and in the other direction under the action of a return spring (not represented), between the bottom air end-stop 16 and the top air end-stop 31. This displacement corresponds to a rotation of the air flap 5 between the fully open position and the fully closed position. It will also be noted in FIG. 3 that the toothed crown ring 12 driving the air flap 5 and the return end-stop 34 do not come into contact with the driving pawl 15, which is returned against the bottom air end-stop 16, when the three-way valve is in the configuration of FIG. 2a (air flap open and gas flap closed). The kinematic chain of the toothed wheels and crown rings is such that it leaves a gap between the return end-stop 34 and the bottom air end-stop which is greater than the thickness of the driving pawl 15. The utility of this gap will be detailed later, in relation to FIG. 9.

In parallel, there are, on the EGR pathway, two end-stops, a bottom gas end-stop 32 and a top gas end-stop 33 associated with the extreme positions that can be assumed, respectively, by the first 62 and the second 63 ends of the toothed crown ring 13 driving the gas flap 6.

Figure 6:
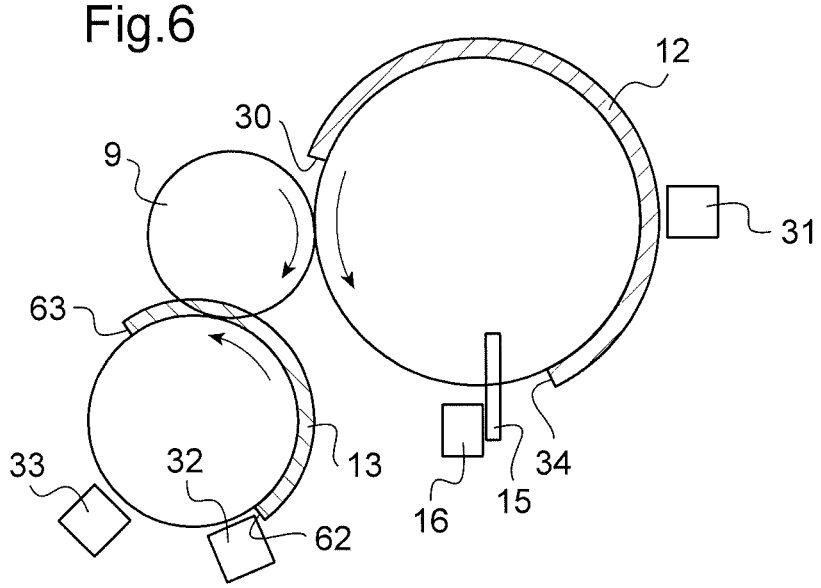

The function of the above end-stops will be better explained, in relation to FIGS. 6 to 9 which are representative of the operation of a three-way valve according to the invention. In these figures, the central teeth 11 and the peripheral teeth 10 of the intermediate toothed wheel 9 have been combined in order to simplify the drawing. FIG. 6 corresponds to an operation of the valve 1 in normal mode, in the configuration of FIG. 2a, that is to say, air flap 5 fully open and gas flap 6 fully closed. FIG. 7 corresponds to an operation of the valve 1 in normal mode, in the configuration of FIG. 2d, that is to say, air flap 5 fully closed and gas flap 6 fully open. As for FIG. 8, it represents a first defective operating mode, in which the air flap 5 is no longer driven, the pawl 15 not reaching the top air end-stop 31 and in which the gas flap 6 goes beyond the fully open position, the second end 63 of its toothed crown ring 13 then arriving in end-stop against the top gas end-stop 33. Finally, FIG. 9 represents a second defective operating mode, in which the air flap 5 is no longer returned to the fully open position, the return spring being assumed to have broken or else a hard point in the kinematic chain of the air pathway preventing the return of the pawl 15 solely under the force exerted by this spring.

The operation of the invention is described, firstly in the normal mode with reference to FIGS. 6 and 7, then in the defective mode corresponding to FIG. 8.

FIG. 6 represents the situation of the elements of the valve 1 in the configuration of FIG. 2a, that is to say before the introduction of recirculated gases. The intermediate toothed wheel 9 has brought the first end 62 of the crown ring 13 driving the gas flap to abut against the bottom gas end-stop 32, which corresponds to the fully closed position for the gas flap 6. In parallel, the toothed crown ring 12 driving the air flap is in a position such that its driving end-stop 30 is separated from the driving pawl 15; the latter bears against the adjustable end-stop 16, under the action of the return spring which tends to return the air flap 5 to its fully open position. Its return end-stop 34, although the toothed crown ring 12 is in one of its extreme angular positions, is not in contact with the driving pawl 15.

The enabling of the recirculation of the gases is reflected in a rotation of the intermediate toothed wheel 9. On the one hand this rotation causes the toothed crown ring 13 of the gas flap to rotate and moves its first end 62 away from the bottom gas end-stop 32 to bring its second end 32 closer to the top gas end-stop 33, but without reaching it; on the other hand it causes the toothed wheel 12 of the air flap to rotate so that it, initially, approaches the driving end-stop 32 of the pawl 15 then, in a second stage drives the latter in rotation until it bears against the top air end-stop 31. The situation of the valve 1 is then the one represented in FIG. 7, which corresponds to the case of FIG. 2d, with the air flap 5 fully closed and the gas flap 6 fully open.

It can be seen in FIG. 7 that the rotation of the intermediate toothed wheel 9 is blocked by the bearing of the pawl 15 against the top air end-stop 31 and that it cannot continue its rotation. In this situation, the invention provides for the kinematic chain of the toothed wheels to be such that the second end 63 of the toothed crown ring 13 does not come into contact with the top gas end-stop 33, but that a gap remains between them. This gap is not designed to be cancelled, as long as the valve is in its normal operating mode.

FIG. 8 represents the operation of the valve 1 in the first case mentioned of a malfunction, that is to say, that of a break of the teeth in the kinematic chains, of a clutch problem or of a break of the driving pawl 15. There is then no longer a one-to-one link between the meshings of the toothed crown rings 12 and 13. Because of the break in the driving of the pawl 15 by the intermediate toothed wheel 9, the latter does not come into end-stop against the top air end-stop, or if it is there, it does not offer any resistance to a continuation of the rotation of the intermediate wheel 9. The latter therefore drives the toothed crown ring 13 driving the gas flap beyond the fully open position of the gas flap 6 and its second end 63 strikes the top gas end-stop 33.

A sensor sensing the position of the gas flap 6, placed somewhere on the EGR pathway, whether on the flap 6, its axis 61 or the toothed crown ring 13, will be able to detect this additional rotation of the toothed crown ring and to trigger an air pathway failure alert.

A method for diagnosing the correct operation of the air pathway may also be put in place, by virtue of a three-way valve configured according to the invention.

It consists in initiating a rotation of the intermediate toothed wheel 9 so that the toothed crown ring 13 driving the gas flap performs a complete travel, from the position where its first end 62 is on the bottom gas end-stop 32 and where the gas flap 6 is in the fully closed position, to the fully open position of this flap. In the case where the air pathway is healthy, the rotation of the toothed wheel 9 will be stopped upon the contact of the driving pawl 15 with the top air end-stop 31 and the sensor will detect a position of the gas flap 6 corresponding to the fully open position. Otherwise, the pawl will not be driven and will provide no blockage to the wheel of the intermediate wheel 9; the latter will drive the toothed crown ring 13 which will go beyond the fully open position of the gas valve 6 and will be stopped only by its second end 63 coming upon the top gas end-stop 33. By this excessive rotation, the sensor sensing the position of the gas flap will then detect the failure that has occurred on the air pathway. Such a diagnostic method is applied, for example, each time the vehicle is started up and any failure will be signalled to the driver by an indication on the dashboard.

Another means for detecting a failure of the air pathway may be created by fitting a contact detector between the second end 63 of the toothed crown ring 13 and the top gas end-stop 33.

FIG. 9 represents the position that is given to the valve 1 in the second case of malfunction mentioned, in which the pawl 15 is no longer returned against the bottom air end-stop 16. Such a case can, for example, occur following a break of the return spring or else the occurrence in the control chain, of a hard point that the force exerted by the return spring cannot overcome.

In this case, the actuation of the electric motor 7 to return to the position corresponding to FIG. 2a will result in a rotation of the toothed crown ring 12 driving the air flap 5 in the clockwise direction and the return of the end of its scallop forming the return end-stop 34 toward the bottom air end-stop 16. That done, this return end-stop drives the pawl 15 toward the bottom air end-stop 16, from the point where it is blocked, and brings the air flap 5 into a position close to its fully open position. In other words, use is made of the torque developed by the electric motor 7 to mitigate the failure of the spring. The vehicle engine can therefore continue to function despite the failure observed on the operation of the three-way valve.

A gap is, however, left between the pawl 15 and the bottom air end-stop 16 so that, in normal operation, the return end-stop 34 does not interfere, for example under the action of vibrations, with the positioning of the driving pawl 15.

FIG. 10 illustrates a variant embodiment of the means for actuating the air pathway. In the latter, there are the toothed crown ring segment 12, represented transparently, and the return spring, the turns 100 of which are partially visible, accompanied by a control wheel 50. The latter is linked in rotation to the air flap, not represented, and free in rotation relative to the toothed crown ring segment 12.

Said control wheel 50 is able to be driven by said toothed crown ring segment 12, when said air flap switches from its fully open position to its fully closed position, and by the return spring, when said air flap is actuated in return mode and always with a temporal phase-shift relative to the gas flap 6, not represented in this figure.

For this, said toothed crown ring segment 12 comprises a driving end-stop 53, capable of cooperating with a driving end-stop 54 of the control wheel 50, when said air flap 5 switches from its fully open position to its fully closed position. More specifically, as illustrated in FIG. 10, said toothed crown ring segment 12 is configured so that its driving end-stop 53 is angularly set back from the driving end-stop 54 of the control wheel 50 in a first phase of rotation of said toothed crown ring segment 12, corresponding to the switching of the valve from the configuration of FIG. 2a to that of FIG. 2b. The two driving end-stops 53, 54 then come into contact and, in a second phase of rotation of the toothed crown ring segment 12, the latter drives the control crown ring 50. In other words, in this second phase, the air flap is driven by the motor of the valve from its fully open position to its fully closed position.

In the reverse direction of rotation, in normal mode, the spring drives the control wheel 50 which presses the driving end-stop 54 of said control wheel against the bottom air end-stop 16 in the fully open position of the air flap, as is illustrated in FIG. 10. The bottom air end-stop 16 is here made of the same material as the body of the valve. The driving end-stop 54 has a radial extension to cooperate with the bottom air end-stop 16.

The top air end-stop 31 that makes it possible to deal with the first case of malfunction mentioned, that is to say that of a break of the teeth of the kinematic chains, can also be seen in this figure. Said top air end-stop 31 is here made of the same material as the valve body. For the same purpose, the control wheel 50 is provided with a diagnostic end-stop 55 and said control wheel 50 and said valve body are configured so that said top air end-stop 31 and said diagnostic end-stop 55 come into contact in said first case of malfunction.

In order to avoid interference between end-stops, said diagnostic end-stop 55 is situated, for example, on the face of the control wheel 50 opposite those provided with the driving end-stop 54 and/or at the periphery of said control wheel 50.

To deal with the second case of malfunction, said toothed crown ring segment 12 here comprises a return end-stop 71, capable of cooperating with a return end-stop 52 of the control wheel 50 in the case of a failure of said return means.

As in the preceding embodiment, said return end-stops 71, 52 have an angular offset when the air flap 5 is in its fully open position, as illustrated in FIG. 10.

Said return end-stop 52 of the control wheel 50 is here placed in the angular extension of the driving end-stop 54 of said control wheel and/or on the same face of said wheel as the latter. Said return 52 and driving 54 end-stops of the control wheel can bear on one another using a spacer 56.

The invention has been described with a three-way valve used in the context of an EGR loop, with progressive opening of the EGR pathway followed by a closure, with a temporal offset, of the air pathway. It can perfectly well be implemented on any type of three-way valve. In particular, it will be able to be used in a three-way valve, used in another application, notably with different directions for the opening and the closing of the flaps.

The invention claimed is:

1. A three-way valve with two gates respectively arranged in two of three pathways of the three-way valve, said three-way valve comprising:
a single control gear for the two gates; and
a first gear and a second gear arranged to be controlled by the single control gear, each of the first and second gears configured to drive a respective one of the two gates from a first position to a second position,
said single control and the first and second gears being configured to enable the two gates, in a normal operating mode, to reach their respective second positions, wherein said three-way valve includes a maximum displacement end-stop for at least one of said first and second gears, said maximum displacement end-stop being configured to block said first and second gears when a second gate of the two gates is in the second position; and
a detection system for detecting a travel of a first gate of the two gates that exceeds further than the second position, the detection system comprising a sensor, and wherein said maximum displacement end-stop blocks said second gear, and
said detection system further comprises an end-stop for the first gear that is disposed at a predetermined position from the end stop of said first gear when the second gear is on the maximum displacement end-stop in the normal operating mode.

2. The three-way valve according to claim 1, wherein the sensor of the detection system is configured to measure a position of the second gate.

3. The three-way valve according to claim 2, wherein the detection system further comprises an end-of-travel end-stop, provided on said first gear and a detector of contact between said end-of-travel end-stop and the end-stop of said first gear.

4. The three-way valve according to claim 1, wherein said two gates are flaps, and wherein said single control and first and second gears are configured to drive said flaps pivotwise and the first and second gears each include toothed crown ring segments.

5. The three-way valve according to claim 4, wherein said end-stop of the first gear is arranged facing one face of a corresponding toothed crown ring segment, forming an end of the corresponding toothed crown ring segment.

6. The three-way valve according to claim 4, wherein the second gears also comprises a pawl circulating in a scallop formed in the toothed crown ring segment of the second gear, the maximum displacement end-stop associated with said second gear being attached to a body of the three-way valve and positioned facing said pawl.

7. The three-way valve according to claim 4, wherein the second gear further comprises a control wheel, linked in rotation to the first flap and free in rotation relative to said toothed crown ring segment of the second gear, said control wheel being driven by said toothed crown ring segment of the second gear when said first flap switches from the first position to the second position.

8. The three-way valve according to claim 7, wherein said control wheel includes a diagnostic end-stop configured to abut against the maximum displacement end-stop when the second gate is in the second position.

9. The three-way valve according to claim 1, wherein said first and second positions are open and closed positions of one of the two pathways.

10. The three-way valve according to claim 1, wherein said single control and first and second gears are configured to drive said two gates with a temporal phase-shift so that, while continuing to displace the first gate from the first position to the second position via the first gear to an open position, which respectively open the corresponding pathway, the second gate is made to begin to displace from the first position to the second position via the second gear to a closed position, which respectively closes the corresponding pathway.

11. The three-way valve according to claim 10, wherein said second gear is returned by a return spring from the second position to the first position.

12. The three-way valve according to claim 1, wherein the two gates are arranged in the two inlet pathways, the three-way valve then being an EGR (exhaust &as recirculation) loop valve for a cold side, linked to an intake manifold of an internal combustion engine of a motor vehicle.

13. A method for testing the integrity of the kinematic chain of a three-way valve according to claim 1, comprising:
setting said first gear in motion via said single control gear, from the first position of an associated gate of the two gates towards the second position of said associated gate of the two gates; and
measuring the extreme position reached by a flap.

* * * * *